United States Patent [19]

van den Boom et al.

[11] 4,199,128
[45] Apr. 22, 1980

[54] VIBRATION ABSORBING ELASTOMERIC MOUNT WITH HYDRAULIC DAMPING

[75] Inventors: Johannes van den Boom, Kösching; Gert Salwesky, Lenting; Frank-Uwe Gödel, Ingolstadt; Wilfried Leitner, Eichstätt, all of Fed. Rep. of Germany

[73] Assignee: Audi NSU Auto Union Aktiengesellschaft, Neckarsulm, Fed. Rep. of Germany

[21] Appl. No.: 932,371

[22] Filed: Aug. 9, 1978

[30] Foreign Application Priority Data

Aug. 11, 1977 [DE] Fed. Rep. of Germany ....... 2736188

[51] Int. Cl.² ............................................ F16F 15/00
[52] U.S. Cl. ................................. 248/562; 267/140.1
[58] Field of Search ............... 248/562, 631, 632, 634, 248/636; 188/298; 267/140.1, 35

[56] References Cited

U.S. PATENT DOCUMENTS

| 2,380,899 | 7/1945 | Strachovsky | 188/1 B |
| 2,387,066 | 10/1945 | Harding | 188/298 X |
| 2,896,937 | 7/1959 | Miller | 188/1 B X |
| 2,966,351 | 12/1960 | Scholz | 188/298 X |
| 2,969,973 | 1/1961 | Scholz | 188/298 X |
| 3,361,216 | 1/1968 | Walker | 188/298 X |
| 3,874,646 | 4/1975 | Vernier | 267/140.1 |
| 4,071,119 | 1/1978 | Benjamin | 188/298 |

FOREIGN PATENT DOCUMENTS 323178 1/1930 United Kingdom ..................... 248/634

Primary Examiner—J. Franklin Foss
Attorney, Agent, or Firm—Karl F. Ross

[57] ABSTRACT

A vibration-absorbing mount with hydraulic damping, especially for mounting an internal-combustion engine upon a vehicle chassis, comprises a housing subdivided internally by an elastic wall which is connected with the force-transmitting member of the mount and is formed with an orifice enabling fluid to pass between the two chambers. For small pressure differentials, the pressure equalization between the two chambers is effected substantially by transfer of fluid through the orifice while large pressure differentials, representing high frequency oscillations, are damped primarily by deformation of the movable wall.

5 Claims, 3 Drawing Figures

4,199,128

VIBRATION ABSORBING ELASTOMERIC MOUNT WITH HYDRAULIC DAMPING

FIELD OF THE INVENTION

The present invention relates to a vibration-absorbing or vibration-damping mount, especially for the mounting of an internal-combustion engine upon a vehicle chassis, using elastomeric means at least in part for damping. More particularly, the invention relates to an elastomeric mount provided with hydraulic damping for the aforedescribed purpose.

BACKGROUND OF THE INVENTION

It is known to provide an elastic mount between an internal-combustion engine and a vehicle chassis to damp both high and low frequency vibrations and prevent direct transmission of vibrations of the engine to the chassis.

In systems in which an internal-combustion engine is to be elastically mounted on a vehicle chassis, vibrations of low frequency should be damped to a lesser extent to prevent work hardening of the elastic material and improve acoustic insulation in the audible range.

To this end it is known to provide an elastic mount which uses in part the deformation of an elastomeric body or material and in part hydraulic damping in which a movable member is provided with an orifice separating a pair of chambers and in which hydraulic damping is effected by forcing fluid from one chamber to the other through the orifice.

An elastic mount having an enclosed gas chamber or cushion is disclosed in the German utility model (Gebrauchsmuster) DT-GM No. 18 05 392. In this system, the compression of the mount reduces the volume of the chamber delineated in part by the elastomeric material and forces the damping fluid through a throttle orifice in a separating membrane within the chamber. The chamber is thus defined in part by a rigid wall which forms one of the compartments into which the fluid is forced by reduction in the volume of the gas cushion. Upon expansion, a pressure drop in the gas cushion enables the damping fluid to flow from the compartment delivered by the rigid wall into the compartment by the elastomeric wall.

A mount of this type, which must include a gas cushion, is expensive to fabricate. Because of permeation of the flexible wall by the gas or diffusion of the gas through the latter, the damping effect after some time develops indeterminate values.

Since a mount having elastomeric members and subjected to high stress can become very hot and the volume and pressure of the enclosed gas is dependent upon the temperature, there is a disadvantageous effect upon the stiffening of the mount and its damping effect between cold and warm states.

With rapid compression of the mount, corresponding to high vibration frequencies, the liquid exchange between the two chambers can no longer occur completely during the compression stage and thus the damping effect is reduced. The stresses also result in hardening or stiffening of the elastomeric members at a rapid rate.

An elastic mount having two working compartments separated by a membrane and defined at least in part by elastomeric walls is disclosed in German utility model (Gebrauchsmuster) DT-GM No. 76 32 663. In this system, the separating membrane is formed with a throttle orifice and is yieldable in the axial direction in the region of this orifice to reduce the damping effect with higher frequency vibrations.

In this case, the damping liquid has less of a supporting function so that the elastomeric walls of the mount must be made sufficiently stiff to take up the supporting function. This can be achieved by making these walls relatively thick. A mount of this type uses considerable elastomeric material.

The elastomeric elements which delineate the outer walls of the compartments change shape during compaction of the mount and generate a pressure difference between the two compartments. This pressure difference is reduced by yielding of the membrane and thus the damping which can be effected by passage of the damping liquid through the orifice, is reduced. This reduction in the damping occurs even with small pressure differentials characterizing low frequency vibrations where a high degree of damping is desired. Naturally, this is a disadvantage.

OBJECTS OF THE INVENTION

It is the principal object of the present invention to provide an improved elastic mount for the purposes described which is capable of affording a high degree of damping for low frequency vibrations and reduced damping at higher frequencies, usually outside the audible range.

Still another object of the invention is to provide a shock or vibration damping mount, especially for elastically mounting an internal combustion engine upon a vehicle chassis whereby the disadvantage of previous systems can be avoided.

Still another object is to provide an improved mount for the purposes described which has above a predetermined frequency below the acoustic range a substantially reduced damping effect.

It is also an object of the invention to provide a mount for the purposes described which can be fabricated at low cost, which maintains its damping and vibration absorbing characteristics over a wide temperature range, which does not suffer significant deterioration of its supporting or damping characteristics with time and which, in general, has a greater useful life than earlier engine mounts.

SUMMARY OF THE INVENTION

These objects and others which will become apparent hereinafter are attained, in accordance with the present invention, in an elastic mount with hydraulic damping, preferably for use as an engine mount for elastically mounting an internal combustion engine on a vehicle chassis, in which a working chamber containing a damping liquid has a throttle bore and is provided with a movable wall which subdivides the chamber into two compartments communicating by the throttle bore or orifice. An outer chamber wall is formed as an elastomeric member and is attached to the load by a mount core.

According to this invention, the working chamber is completely filled with the damping liquid and the movable wall is in force transmitting relationship with the mount core connected to the engine. The wall has an intrinsic stiffness such that with small pressure differentials, the pressure equalization between the two compartments is effected substantially completely by transfer of the damping liquid through the throttle bore or orifice while with larger pressure differentials between the two compartments, the pressure equalization is effected by deformation of the movable wall.

Upon deformation of the mount from its statically loaded state (dynamic loading) the mount core and the wall connected thereto move away from or toward the stationary wall of the chamber, affixed, for example, to the chassis to develop a pressure in the compartment in the direction of movement which creates a pressure differential between the two compartments.

The pressure differential is equalized by the transfer of the damping liquid through the throttle bore between the two compartments, i.e. from the high pressure compartment to the low pressure compartment.

Especially at low frequencies, this pressure differential is not very great. With more rapid distortion of the mount, however, although a predetermined vibration frequency, the fluid can no longer transfer sufficiently rapidly through the throttle orifice. The pressure differential between the two compartments is, as a result, so great that the movable wall according to the invention is deformed to effect pressure equalization in conjunction with fluid transfer through the throttle orifice. Since the pressure differential is not reduced rapidly by liquid transfer through the orifice, practically no damping occurs by transfer of liquid.

Preferably, the movable wall separating the two compartments from one another is formed as a roll bellows, i.e. a membrane provided with at least one fold which tends to roll out upon deformation of this movable wall. The bellows advantageously has a rigid force transmitting part connected with mount core and provided with the throttle opening or, as required, with a plurality of throttle orifices.

Upon displacement of this rigid portion of the roll bellows the elastomeric parts thereof have a minimum resistance because of the presence of the fold or folds. With a high one sided pressure upon the roll bellows, its original shape is changed to a degree depending on its stiffness and pressure equalization is effected by this shape change.

According to another feature of this invention, the mount is provided with a rigid (non elastomeric) wall on the side of the mount opposite the bearing core. As a result, the filling liquid can have a supporting function and the elastomeric elements can be made of smaller thickness and softer.

Upon extreme deformation of the mount in the direction of the rigid wall, the movement of the elastic membrane or partition and the movable wall of the mount can be limited by an elastic stop (abutment) ring which affords a cushioning function and assists in damping vibration.

An important advantage of the present invention is that the mount is simple and relatively inexpensive and affords better acoustic insulation in the audible range without adversely affecting the lower frequency vibration damping characteristics. In an advantageous manner, the shape stability of the roll bellows can be selected for maximum damping force while the total cross action of the throttle orifice or orifices will determine the frequency at which this maximum is obtained, the two parameters being determined independently from one another in accordance with requirements of the mount.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
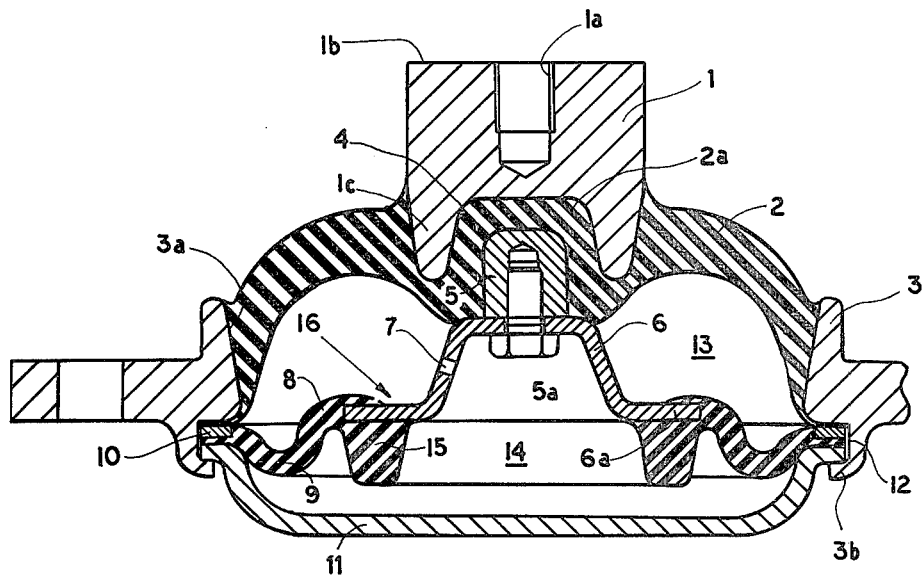
FIG. 1 is an axial cross sectional view through an elastic engine mount in accordance with the present invention showing the mount in its statically loaded state.
Figure 2:
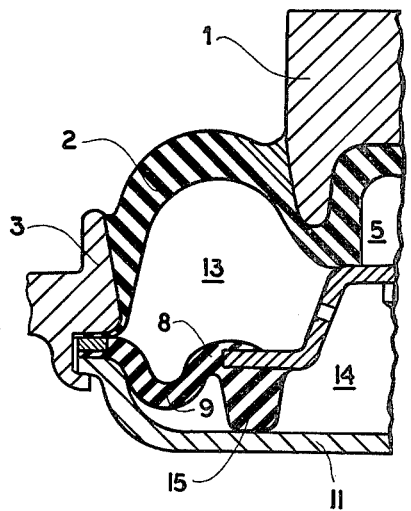
FIG. 2 is a partial axial cross section showing the mount in its limiting compressed state.
Figure 3:
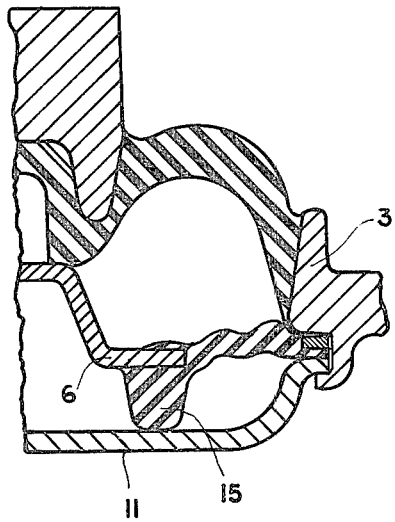
FIG. 3 is a view similar to FIG. 2 showing the mount in a dynamically loaded state having an intrinsically deformed roll bellows in accordance with the present invention.

The mount shown in FIGS. 1–3 is used to support an internal combustion engine (not shown) upon a vehicle chassis (not shown) and comprises a mount core 1 in the form of a metal force which is provided with an internal threaded bore a adapted to receive an engine mounting bolt. The engine block rests upon the surface 1b of the core 1. The core 1 is provided with a tapered angular ridge to which is vulcanized an elastomeric supporting body 2 forming a wall of a compartment 13 described above. The wall 2 is, in turn, vulcanized to a downwardly tapered bore 3a of a metal flange 3 which can be bolted to the chassis. The core 1 defines a recess 4 in which a boss 2a on the elastomeric body 2 is vulcanized. This boss being hollow and receiving a metal block 5 in the form of an internally threaded sleeve which is externally vulcanized to the elastomeric body 2.

Between the flange 3 and the block 5, there is provided a movable wall 16 which is connected by the bolt 5a to the block 5.

To this end, the wall 16 is provided with a metal frustoconical member 6 whose transfer flange 6a is received in an vulcanized to the elastomeric roll bellows 8 of the wall. The roll bellows 8 is, in turn, provided with a stiffening ring 10 of metal vulcanized to the elastomeric material along the circumference thereof. This circumference is clamped between a rigid (metallic) cover 11 in a groove 12 of the flange 3 the latter having a clenched over portion 3b securing the wall 3 and the bellows 8 sealingly in place. Between the rigid members 6 and ring 10, the roll bellows 8 is provided with at least one fold as shown at 9.

A throttle orifice 7 formed in the rigid member 6 communicates between the two compartments 13 and 14 of the completely liquid filled chamber.

The upper chamber 13 is defined between wall 2 and the wall 16 while the lower chamber 14 is defined between wall 16 and wall 11.

The block 5, in accordance with an important feature of the invention, is thus connected to the mount core 1 by an elastomeric layer 2a to limit the body sound transmission via the bridge formed between the flange, and the core 1.

When the mount is loaded from its unstressed condition by the weight of the internal combustion engine, the rigid part 6 of wall 16 is pressed in downwardly and the mount as the configuration shown in FIG. 1. This increases the pressure in the lower chamber 14 which pressure is equalized with that in compartment 13 through the throttle orifice 7. The liquid flows through this orifice into the upper compartment 13.

Upon loading, the carrying part 2 bulges outwardly and the pressure buildup prevents cavitation during liquid transfer through throttle orifice 7.

With extremely high loading, which can develop at very low frequencies, the mount can be brought into the position shown in FIG. 2 in which the elastic abutment ring 15 comes to rest against the rigid wall 11. The equilibrium position of the mount lies between its statically stressed position shown in FIG. 1 and the newly developed displacement of the mount results in slight compression of the soft elastic ring 15.

In any of its equilibrium positions, dynamic forces applied to the mount result in flow of the liquid through the throttle orifice 7. Such flow is paramount in damping the vibrations as long as the frequency of the dynamic forces is relatively low.

At low frequencies, there is no significant change in shape of the fold 9 of the bellows 8 so that the bellows retains generally its shape as shown in FIGS. 1 and 2.

The change in volumes of the chambers 13 and 14 is followed by a transfer of liquid through the throttle orifice between them. In this frequency range, a high-pressure differential does not develop between the compartments and energy is dissipated by orifice flow of the liquid. The mount thus dampens the vibrations.

At higher frequencies, however, such flow to achieve a new equilibrium is not possible because of the high rate of change of the volumes of the two chambers. In this case, high-pressure differentials arise across the movable wall 16 and are accommodated by deformation of the roll bellows 8 as represented in FIG. 3. This intrinsic deformation of the roll bellows permits a shifting between the flange 3 and the mount core 1 without liquid transfer through the orifice and without significant dissipation of energy. The bearing thus remains yieldable at high frequencies while its damping effect in the high frequency range is minimal.

We claim:

1. A yieldable mount for supporting a load on a structure, comprising:
    a rigid mount core connectable to a load;
    a flange connectable to said structure;
    a yieldable support wall connected to said core and to said flange;
    a further wall connected to said flange and defining with the first-mentioned wall a chamber completely filled with a damping liquid;
    a movable wall in said chamber subdividing same into two compartments and formed in part as a roll bellows having a wavy cross section, said movable wall being provided with at least one throttle orifice communicating between said compartments for permitting liquid flow there between to dissipate energy and damp low-frequency vibrations; and
    means connecting said movable wall to said core for displacement of said movable wall with said core, said movable wall having a stiffness such that relatively low-frequency vibrations between said load and said structure result in pressure equilibration between said compartments primarily by liquid transfer through said orifice while large-pressure differentials between said compartments representing high-frequency vibrations are equilibrated primarily by deformation of the wavy movable wall.

2. The mount defined in claim 1 wherein said movable wall is formed with a rigid member provided with said orifice and connected to said core.

3. The mount defined in claim 2 wherein said further wall is a rigid outer wall opposite said core and said movable wall is formed with an elastically yieldable abutment ring engageable with said further wall.

4. The mount defined in claim 3 wherein said first-mentioned wall is a yieldable wall in part received between said core and said rigid member of said movable wall.

5. The mount defined in claim 4 wherein said load is an internal combustion engine and said structure is a vehicle chassis, said flange having an opening spanning by said first-mentioned wall and vulcanized thereto, said rigid member being vulcanized thereto, said roll bellows having an outer stiffening ring along its periphery and being clamped between said further wall and said flange.

* * * * *